(12) United States Patent
Byrne et al.

(10) Patent No.: US 10,304,412 B1
(45) Date of Patent: May 28, 2019

(54) DEVICE SYNCHRONIZATION

(71) Applicant: Google LLC, Mountain View, CA (US)

(72) Inventors: Paul Byrne, Los Altos, CA (US);
Matthew Amacker, Santa Clara, CA (US); Melissa-Ann Chan, San Francisco, CA (US)

(73) Assignee: Google LLC, Mountain View, CA (US)

( * ) Notice: Subject to any disclaimer, the term of this patent is extended or adjusted under 35 U.S.C. 154(b) by 106 days.

(21) Appl. No.: 15/199,173

(22) Filed: Jun. 30, 2016

(51) Int. Cl.
*G09G 5/12* (2006.01)
*G09G 5/00* (2006.01)
*G06T 1/20* (2006.01)
*G06F 3/14* (2006.01)
*G06F 3/0484* (2013.01)

(52) U.S. Cl.
CPC .............. *G09G 5/12* (2013.01); *G06F 3/0484* (2013.01); *G06F 3/1454* (2013.01); *G06T 1/20* (2013.01); *G09G 5/005* (2013.01); *G09G 5/006* (2013.01); *G06T 2200/28* (2013.01); *G09G 2310/08* (2013.01); *G09G 2320/06* (2013.01); *G09G 2370/022* (2013.01)

(58) Field of Classification Search
CPC .......... G09G 5/12; G09G 5/005; G09G 5/006; G09G 2310/08; G09G 2320/06; G09G 2370/022; G06F 3/0484; G06F 3/1454; G06T 1/20; G06T 2200/28
See application file for complete search history.

(56) References Cited

U.S. PATENT DOCUMENTS 6,069,887 A    5/2000  Geiger et al.
6,236,623 B1   5/2001  Read et al.
6,834,091 B2  12/2004  Litwin et al.
7,454,681 B2  11/2008  Reichert et al.
8,755,785 B2   6/2014  Gong et al.
8,886,782 B2  11/2014  Lucero et al.

(Continued)

FOREIGN PATENT DOCUMENTS

WO   WO2002054192   7/2002
WO   WO2016030721   3/2016

OTHER PUBLICATIONS

Aaron Souppouris, 'Pinch' connects multiple smartphones and tablets together to make a display, The Verge, Jun. 17, 2016.
ScreenShare Technology Licensing, Spring Design, 2014.

*Primary Examiner* — Chong Wu
(74) *Attorney, Agent, or Firm* — McDonnell Boehnen Hulbert & Berghoff LLP

(57) ABSTRACT

An example method includes receiving, by a first computing device, a command regarding operation of an application. A first version of the application is configured to execute on the first computing device and a second version of the application is configured to execute on a second computing device that has a different form factor than the first computing device. In response to receiving the command, the first computing device may determine a series of instructions that cause the first version of the application to display visual representations of an activity on the first computing device synchronized to displayed visual representations of the activity on the second computing device. The displayed visual representations are respectively adapted to the form factors of the first and the second computing devices. The first computing device may execute the determined series of instructions.

20 Claims, 7 Drawing Sheets

(56) References Cited

U.S. PATENT DOCUMENTS

| | | | |
|---|---|---|---|
| 9,076,124 B2 | 7/2015 | Kawahara et al. | |
| 9,077,912 B2 | 7/2015 | Gong et al. | |
| 9,134,798 B2* | 9/2015 | Morris | H04L 67/42 |
| 2002/0075149 A1 | 6/2002 | Goodwin et al. | |
| 2004/0179040 A1 | 9/2004 | Patel et al. | |
| 2006/0073785 A1* | 4/2006 | Klassen | H04W 76/005 |
| | | | 455/3.01 |
| 2007/0153090 A1 | 7/2007 | Liow et al. | |
| 2008/0216125 A1 | 9/2008 | Li et al. | |
| 2009/0117846 A1 | 5/2009 | Mavrakakis | |
| 2010/0145790 A1* | 6/2010 | Brignull | G06Q 30/02 |
| | | | 705/14.41 |
| 2012/0200774 A1 | 8/2012 | Ehlers | |
| 2012/0257561 A1 | 10/2012 | Redding | |
| 2013/0061280 A1 | 3/2013 | Bartnik et al. | |
| 2013/0073965 A1* | 3/2013 | Sik | G06F 17/241 |
| | | | 715/730 |
| 2013/0080525 A1 | 3/2013 | Aoki et al. | |
| 2014/0149927 A1* | 5/2014 | Yoon | G09G 5/10 |
| | | | 715/794 |
| 2014/0340577 A1 | 11/2014 | Ocampo et al. | |
| 2015/0143216 A1* | 5/2015 | Huang | H04L 51/04 |
| | | | 715/208 |
| 2015/0193784 A1* | 7/2015 | Gao | G06Q 30/0201 |
| | | | 705/7.29 |
| 2016/0320936 A1* | 11/2016 | Carlos | G06F 3/0484 |

* cited by examiner

DEVICE SYNCHRONIZATION

BACKGROUND

A number of different applications, or "apps," are available for use on a number of different types of computing devices such as laptop computers, tablets, and smartphones. The different applications may be used for communication, entertainment, or productivity, and may include messaging, gaming, video streaming, and social networking features. A particular application may have different versions that look or function differently on the different types of devices.

SUMMARY

Example embodiments are provided herein for displaying, by at least two computing devices, synchronous visual representations of activities within versions of an application configured for execution by each of the computing devices. Each computing device may be configured to execute a version of the application adapted to a form factor and/or hardware capabilities of the respective computing device. The synchronous display of the visual representations may illustrate the difference in functionality and/or appearance of various activities in different versions of the application across computing devices with different form factors.

One example embodiment may involve receiving, by a first computing device, a command regarding operation of an application. A first version of the application is configured to execute on the first computing device. A second version of the application is configured to execute on a second computing device that has a different form factor than the first computing device. The embodiment may also include, in response to receiving the command, determining, by the first computing device, a series of instructions that cause the first version of the application to display visual representations of an activity on the first computing device. The visual representations of the activity on the first computing device are synchronized to displayed visual representations of the activity on the second computing device. The displayed visual representations are respectively adapted to the form factors of the first and the second computing devices. The embodiment may further include executing, by the first computing device, the determined series of instructions.

In another embodiment, a system may include a first computing device having a first form factor, a second computing device having a second form factor different from the first form factor, and a server device communicatively connected to the first computing device and the second computing device. The server device is configured to provide, to the first computing device and to the second computing device, a command regarding operation of the application. A first version of the application is configured to execute on the first computing device. A second version of the application is configured to execute on the second computing device. The first computing device is configured to receive, from the server device, the command regarding operation of the application. The first computing device is additionally configured to determine, in response to receiving the command, a series of instructions that cause the first version of the application to display visual representations of an activity on the first computing device. The visual representations of the activity on the first computing device are synchronized to displayed visual representations of the activity on the second computing device. The displayed visual representations are respectively adapted to the form factors of the first and the second computing devices. The first computing device is further configured to execute the determined series of instructions.

In an additional embodiment, a non-transitory computer readable storage medium is provided having stored thereon instructions that, when executed by a first computing device, cause the first computing device to perform operations. The operations include receiving a command regarding operation of an application. A first version of the application is configured to execute on the first computing device. A second version of the application is configured to execute on a second computing device that has a different form factor than the first computing device. The operations also include, in response to receiving the command, determining a series of instructions that cause the first version of the application to display visual representations of an activity on the first computing device. The visual representation of the activity on the first computing device are synchronized to displayed visual representations of the activity on the second computing device. The displayed visual representations are respectively adapted to the form factors of the first and the second computing devices. The operations further include executing the determined series of instructions.

In a further embodiment, a system may include means for receiving a command regarding operation of an application. A first version of the application is configured to execute on the first computing device. A second version of the application is configured to execute on the second computing device that has a different form factor than the first computing device. The system also includes means for determining, in response to receiving the command, a series of instructions that cause the first version of the application to display visual representations of an activity on the first computing device. The visual representation of the activity on the first computing device are synchronized to displayed visual representations of the activity on the second computing device. The displayed visual representations are respectively adapted to the form factors of the first and the second computing devices. The system further includes means for executing the determined series of instructions.

The foregoing summary is illustrative only and is not intended to be in any way limiting. In addition to the illustrative aspects, embodiments, and features described above, further aspects, embodiments, and features will become apparent by reference to the figures and the following detailed description and the accompanying drawings.

DETAILED DESCRIPTION

Figure 1:
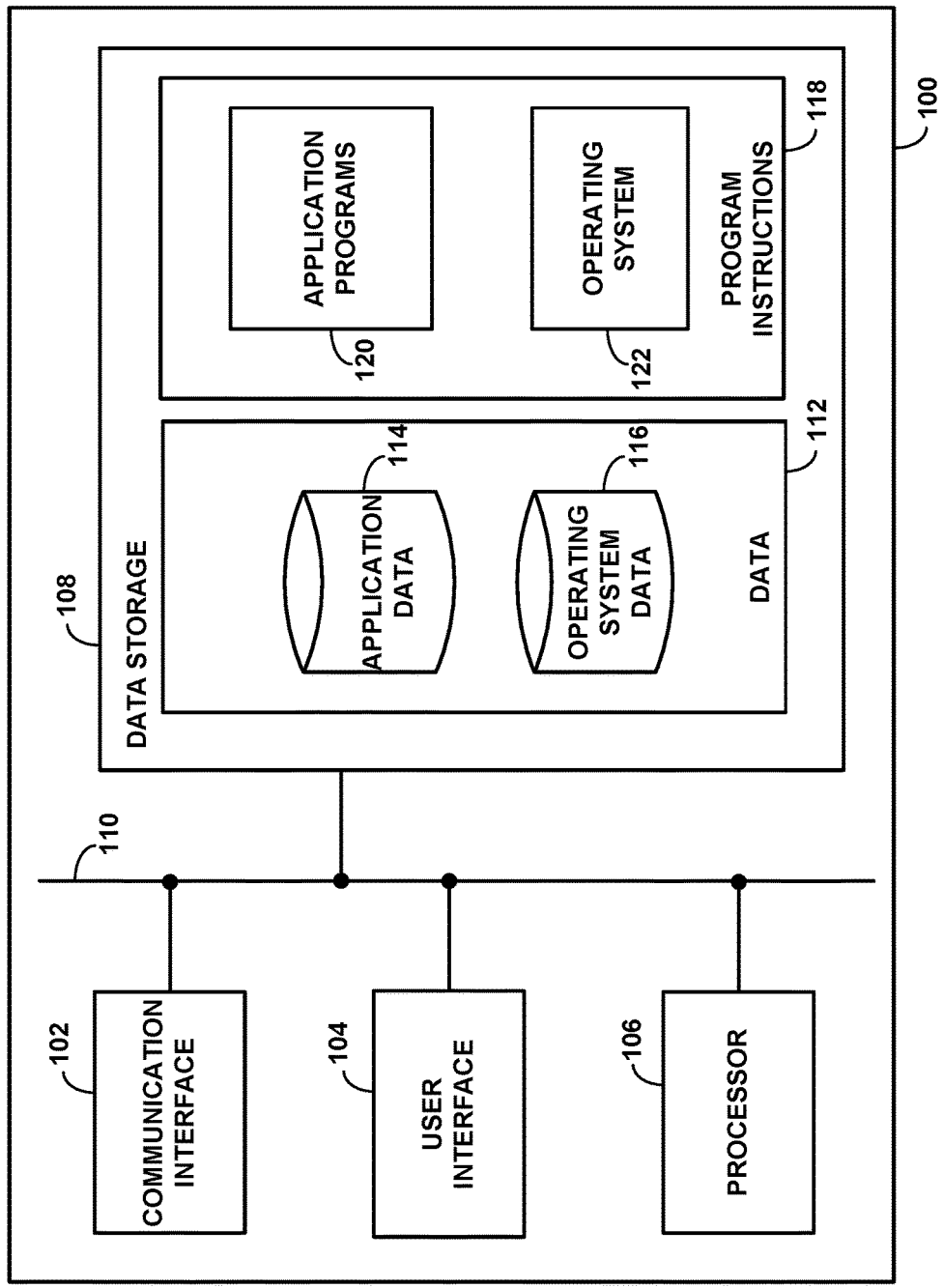
FIG. 1 illustrates an example computing device, according to an example embodiment.

The following detailed description describes various features and operations of the disclosed devices, systems, and methods with reference to the accompanying figures. The illustrative device, system, and method embodiments described herein are not meant to be limiting. It should be understood that the words "exemplary," "example," and "illustrative," are used herein to mean "serving as an example, instance, or illustration." Any implementation, embodiment, or feature described herein as "exemplary," "example," or "illustrative," is not necessarily to be construed as preferred or advantageous over other implementations, embodiments, or features. Further, aspects of the present disclosure, as generally described herein and illustrated in the figures, can be arranged, substituted, combined, separated, and designed in a wide variety of different configurations.

In the following detailed description, reference is made to the accompanying figures, which form a part thereof. Other embodiments may be utilized, and other changes may be made, without departing from the spirit or scope of the subject matter presented herein. Further, unless otherwise noted, figures are not drawn to scale and are used for illustrative purposes only. Moreover, the figures are representational only and not all components are shown. For example, additional structural or restraining components might not be shown.

I. Overview

Applications, or "apps," are specialized programs downloaded, stored, on, and/or executed by computing devices such as laptops, tablets, smartphones, smartwatches, and smart televisions. Due to hardware capabilities and limitations associated with form factors of the different types of computing devices, a particular application may be offered in different versions that look and/or operate differently on the different types of computing devices. For example, a smartwatch may provide a condensed version of an email application (e.g., fewer features may be available in the application and/or fewer emails may be displayed on the screen at once) due to the small size of the screen of the smartwatch. In contrast, a tablet may display a more expansive version of the email application (e.g., more features than the smartwatch and/or more emails displayed on the screen at once) due to the large size of the screen of the tablet.

Further, the functionality of the user application may be controllable by different types of user input gestures corresponding to the form factor and hardware capabilities of specific types of the computing devices. For example, a version of the user application on a smartphone may be controllable via a touchscreen input of the smartphone. The smartphone may additionally include an inertial measurement unit (IMU) that may provide data indicative of a motion of the phone. The motion data may be used to trigger various operations, actions, or activities within a version of a user application on the smartphone (e.g., display a vertical or horizontal layout of the application based on the orientation of the phone). In another example, a version of the application on a laptop may be controllable via a touchpad of the laptop.

The manner of interacting with the particular device may further dictate the appearance of the version of the application on a particular device. For example, the size of the icons and buttons within a smartphone version of the application may be larger (e.g., larger than the size of buttons in a laptop version of the application) to accommodate the average area of a human fingertip. In contrast, the touchpad of a laptop may offer more precise control than the touchscreen of the smartphone. Thus, a version of the user application on the laptop may include small icons (e.g., smaller than the size of icons in a smartphone version of the application) that can be easily selected due to the more precise control offered by the touchpad.

Individuals interesting in acquiring a particular type of device having a specific form factor (e.g., laptop, tablet, phone, watch, television) may be interested in seeing, prior to acquiring the particular type of device, how different applications will look and operate on the particular type of device. Similarly, individuals who have already acquired the particular type of device may be interested in learning how to interact with and operate the different applications available on the particular type of device. For example, a user of a smartwatch may wish to learn how to use the email application on the smartwatch to read, compose, send, and otherwise manage their emails. The user may be familiar with how to perform the various activities/function on a smartphone or laptop and may wish to learn how to operate the smartwatch to perform the same activities/functions.

In order to show the appearance and functionality of different versions of an application, at least two different computing devices having different form factors may simultaneously and synchronously display visual representations of how a particular activity may look within the different versions of the application executed by the different computing devices. The different computing devices may be placed in close proximity to one another such that a viewer may simultaneously observe both devices synchronously executing various actions to see how the various actions look and operate within the different versions of the application. The different devices may be floor-model devices in a product display kiosk located in a store.

A first computing device may receive a command regarding operation of the application. The command may be provided to cause the first computing device to display, in synchrony with other devices, visual representations of an activity within a version of an application on a first computing device. The command may be provided by, for example, a server device or another computing device communicatively connected to the first computing device. The command may instruct the first computing device to perform a task, operation, or activity within the application. The command may also be provided to a plurality of other devices to synchronize the displayed representations of the task, operation, or activity within versions of the application on the other devices with the version of the application on the first computing device. For example, when the application is an email application, the command may instruct the first computing device to display the contents of the email inbox. When the application is a video player, the command may instruct the video player to play a particular video.

The first computing device may be configured to execute a first version of the application adapted to a form factor of the first computing device. A second computing device may be configured to simultaneously execute a second version of the application adapted to a form factor of the second computing device. The form factor of the second computing device may be different from the form factor of the first computing device. The second computing device may be one of the other devices to which the command regarding operation of the application is also provided.

The first computing device may, in response to receiving the command, determine a series of instructions that cause the first version of the application to display visual representations of an activity of the first computing device. The visual representations of the activity on the first computing device may be synchronized to displayed visual representations of the activity on the second computing device. In other words, both devices may display the visual representations simultaneously to show how the activity looks in the different versions of the application.

The displayed visual representations may be respectively adapted to the form factors of the first and the second computing devices. The determined series of instructions may be instructions for executing or performing the received command on the first computing device. For example, when the received command indicates to display the contents of the email inbox, the determined series of instructions may be instructions that cause the first computing device to request data indicative of the contents of the email inbox and display the contents of the email inbox in a format adapted to the form factor of the first computing device. The first computing device may subsequently execute the determined series of instructions.

Additional commands regarding operation of the application may be provided to the first computing device. The process may be repeated in a loop to illustrate the appearance of a plurality of additional activities in the version of the application executed by the first computing device while simultaneously illustrating the appearance of the plurality of additional activities in the version of the application executed by at least the second computing device. For example, commands may be provided that cause the application to perform and/or display visual representations of some or all features, operations, or activities available in a particular application. Further, commands may be provided to switch to a different application and perform operations or activities available in the different application.

The command regarding operation of the application may be determined based on a user interaction with a user interface of a computing device. The user may perform a particular activity (e.g., reading/composing/deleting email, playing a video, taking a photo) on a first computing device. The particular activity may simultaneously be mirrored/copied by a number of other computing devices. Specifically, the activity or a counterpart of the activity in different versions of the application executed by the other computing devices may be performed and shown on the other computing devices. The other computing device may have different form factors and may execute different versions of the application. Thus, the user may be able to see, by interacting with the first computing device, how the activity will visually appear on the other computing devices. This may help the user determine whether he or she is interested in acquiring any of the computing devices. Alternatively, user interaction with a device may desynchronize the device from the other devices to allow the user to explore the features of the device while the other devices remain in a demo mode (e.g., continue displaying the synchronized visual representations of different activities).

In addition to displaying visual representations of the activity, the computing devices may display representations of user interface gestures that trigger performance of the activity in versions of the application executed by respective computing devices of different form factors. Thus, a user may use a device type that the user is familiar with operating or interacting with to learn how to perform the same or analogous operations on different device types having different form factors. For example, a user may perform activities on a laptop and observe corresponding activities and gestures for triggering the activities on a smartphone. The user may delete a particular email by clicking the delete button in a version of the email application on the laptop. The smartphone may, in response, display an animation showing how to delete the particular email using touchscreen gestures (e.g., swipe the email left, drag the email to the trash folder, etc.).

A server device and/or a computing device designated as a master device of a plurality of computing devices of different form factors may be used to synchronize the execution times of the different activities in the different versions of the application. Synchronizing the execution times of the different activities in the different versions of the application may cause the visual representations of the activities to appear simultaneously across each of the plurality of computing devices. Specifically, the server or master device may determine, for each computing device, a network time delay (e.g., network latency and/or processing delay) based on a round trip time of a data packet sent between the server/master and the respective computing devices. For each computing device, an execution time may be determined for performing the activity on each of the devices. The executions time for the respective computing devices may be based on the network time delays determined for the respective computing devices. Executing instructions corresponding to the activity at the determined execution time across the plurality of devices may result in simultaneous display of visual representations of the activity across the plurality of devices.

In some embodiments, a frequency of user interaction and/or a duration of user interaction with a computing device of a plurality of computing devices may be monitored. The computing devices may be on display in a kiosk/product display stand. The monitored data may be used to determine a relative popularity of the different types of computing devices. Popularity may be affected by and indicative of user preference of, for example, form factors corresponding to the available devices or versions of the application executed by the devices (e.g., visual appearance, available functionality).

In some embodiments, the devices may be arranged in a particular spatial layout. Based on the determined relative popularity, at least one of the devices may display a prompt indicating to swap a position of the device within the particular spatial layout with the position of another device. For example, the position of an unpopular device may be swapped with the position of a highly popular device. If the popularity of the highly popular device is due to positioning (e.g., the device is more noticeable to people walking past a device display kiosk), swapping the position of the unpopular device may generate additional interest in the unpopular device due to the device being more noticeable. The provided prompt may be viewed by and the swapping process may be carried out by an operator of the product display kiosk.

In another embodiment, the volume, brightness, or color of the visual representations of the activity in the different versions of the application may be adjusted based on the determined popularity. For example, the visual representations on unpopular devices may be shown brighter and louder to attract more attention to the unpopular device. Similarly, the visual representations on highly popular devices may be shown dimmer and quieter to allow the unpopular devices to attract more attention.

Alternatively, the unpopular device may be swapped for a different device. The different device may have the same form factor as one of the highly popular devices. Accordingly, the number of the different types computing devices of different form factors on display in the product display kiosk may reflect a level of interest/demand for each device.

In a further embodiment, popularity of two devices having identical form factors but executing different versions of the application may be determined. For example, a first version of the application may display a first set of visual representation of activities in the first version of the application. A second version of the application may display a second set of visual representations of the activities in the second version of the application. The first version and the second version may be different. Frequency and/or duration of interaction with the two different versions of the application may be used to gauge user preference for either version of the application (e.g., conduct A/B testing of different implementations of a user interface of an application).

II. Example Computing Devices

The methods, operations, and/or example embodiments described herein may be performed by a number of different types of computing devices. The computing devices may be, for example, wireless computing devices, tablet computers, desktop computers, laptop computers smartphones, smartwatches, and/or smart televisions. For purposes of example, FIG. 1 illustrates a simplified block diagram showing some of the components of an example computing device 100.

By way of example and without limitation, computing device 100 may be a cellular mobile telephone (e.g., a smartphone), a computer (such as a desktop, notebook, tablet, handheld computer, server computer, or a specialized, purpose-built computer), a personal digital assistant (PDA), a home or business automation component, a digital television, a smartwatch, or some other type of device capable of operating in accordance with the example embodiments described herein. It should be understood that computing device 100 may represent combinations of hardware and software that are configured to carry out the disclosed functions and operations.

As shown in FIG. 1, computing device 100 may include a communication interface 102, a user interface 104, a processor 106, and data storage 108, all of which may be communicatively linked together by a system bus, network, or other connection mechanism 110.

Communication interface 102 may allow computing device 100 to communicate, using analog or digital modulation, with other devices, access networks, and/or transport networks. Thus, communication interface 102 may facilitate circuit-switched and/or packet-switched communication, such as plain old telephone service (POTS) communication and/or Internet protocol (IP) or other packetized communication. For instance, communication interface 102 may include a chipset and antenna arranged for wireless communication with a radio access network or an access point. Also, communication interface 102 may take the form of or include a wireline interface, such as an Ethernet, Universal Serial Bus (USB), or High-Definition Multimedia Interface (HDMI) port. Communication interface 102 may also take the form of or include a wireless interface, such as a Wi-Fi, BLUETOOTH®, global positioning system (GPS), or wide-area wireless interface (e.g., WiMAX or 3GPP Long-Term Evolution (LTE)). However, other forms of physical layer interfaces and other types of standard or proprietary communication protocols may be used over communication interface 102. Furthermore, communication interface 102 may comprise multiple physical communication interfaces (e.g., a Wi-Fi interface, a BLUETOOTH® interface, and a wide-area wireless interface).

User interface 104 may operate to allow computing device 100 to interact with a human or non-human user, such as to receive input from a user and to provide output to the user. Thus, user interface 104 may include input components such as a keypad, keyboard, touch-sensitive or presence-sensitive panel, computer mouse, trackball, joystick, microphone, and so on. User interface 104 may also include one or more output components such as a display screen that, for example, may be combined with a presence-sensitive panel. The display screen may be based on cathode ray tube (CRT), liquid-crystal display (LCD), light-emitting diode (LED) technologies, organic light emitting diode (OLED) technologies, or other technologies now known or later developed. User interface 104 may also be configured to generate audible output(s), via a speaker, speaker jack, audio output port, audio output device, earphones, and/or other similar devices.

In some embodiments, user interface 104 may display one or more buttons, switches, knobs, and/or dials that facilitate interaction with computing device 100. It may be possible that some or all of these buttons, switches, knobs, and/or dials are implemented by way of graphics on a presence-sensitive panel.

Processor 106 may comprise one or more general purpose processors—e.g., microprocessors—and/or one or more special purpose processors—e.g., digital signal processors (DSPs), graphics processing units (GPUs), floating point units (FPUs), network processors, or application-specific integrated circuits (ASICs).

Data storage 108 may include one or more volatile and/or non-volatile storage components, such as magnetic, optical, flash, or organic storage, and may be integrated in whole or in part with processor 106. Data storage 108 may include removable and/or non-removable components.

Processor 106 may be capable of executing program instructions 118 (e.g., compiled or non-compiled program logic and/or machine code) stored in data storage 108 to carry out the various operations described herein. Therefore, data storage 108 may include a non-transitory computer-readable medium, having stored thereon program instructions that, upon execution by computing device 100, cause the computing device 100 to carry out any of the methods, processes, or operations disclosed in this specification and/or the accompanying drawings. The execution of program instructions 118 by processor 106 may result in processor 106 using data 112.

By way of example, program instructions 118 may include an operating system 122 (e.g., an operating system kernel, device driver(s), and/or other modules) and one or more application programs 120 (e.g., camera functions, image processing functions, address book, email, web browsing, social networking, and/or gaming applications) installed on computing device 100. Similarly, data 112 may include operating system data 116 and application data 114. Operating system data 116 may be accessible primarily to operating system 122, and application data 114 may be accessible primarily to one or more of application programs 120. Application data 114 may be arranged in a file system that is visible to or hidden from a user of computing device 100.

Application programs 120 may communicate with operating system 122 through one or more application programming interfaces (APIs). These APIs may facilitate, for instance, application programs 120 reading and/or writing application data 114, transmitting or receiving information via communication interface 102, receiving and/or displaying information on user interface 104, and so on.

In some examples, application programs 120 may be referred to as "apps" for short. Additionally, application programs 120 may be downloadable to computing device 100 through one or more online application stores or application markets. However, application programs can also be installed on computing device 100 in other ways, such as via a web browser or through a physical interface (e.g., a USB port) on computing device 100.

It should be understood that the components of the computing device may be distributed, logically or physically, over multiple devices of the same or of a different type. Additionally, multiple computing devices may work in combination to perform the operations described herein. For example, a server computer may provide instructions to coordinate and/or synchronize the operations of a plurality of other computing devices. In another example, the operations performed in an application program on a first computing device may be mirrored onto a plurality of other computing devices to illustrate the appearance of corresponding versions of the application program on the plurality of other computing devices. Other arrangements are possible.

III. Example Display Kiosk Arrangements

Prior to purchasing a computing device such as a computer, phone, tablet, watch, or television, prospective purchasers may wish to interact with a display model of the device. Interacting with the display model may allow the prospective purchaser to explore and test the features offered by the device, the manner of interacting with the device, and/or the application offered by the device, among a number of other factors that may affect the prospective user's decision to purchase a particular computing device. Since computing devices come in many different form factors that may offer different functionality and different versions of a particular application, the computing devices may be displayed side by side in product display kiosks to allow prospective purchasers to compare the different available options.

Figure 2:
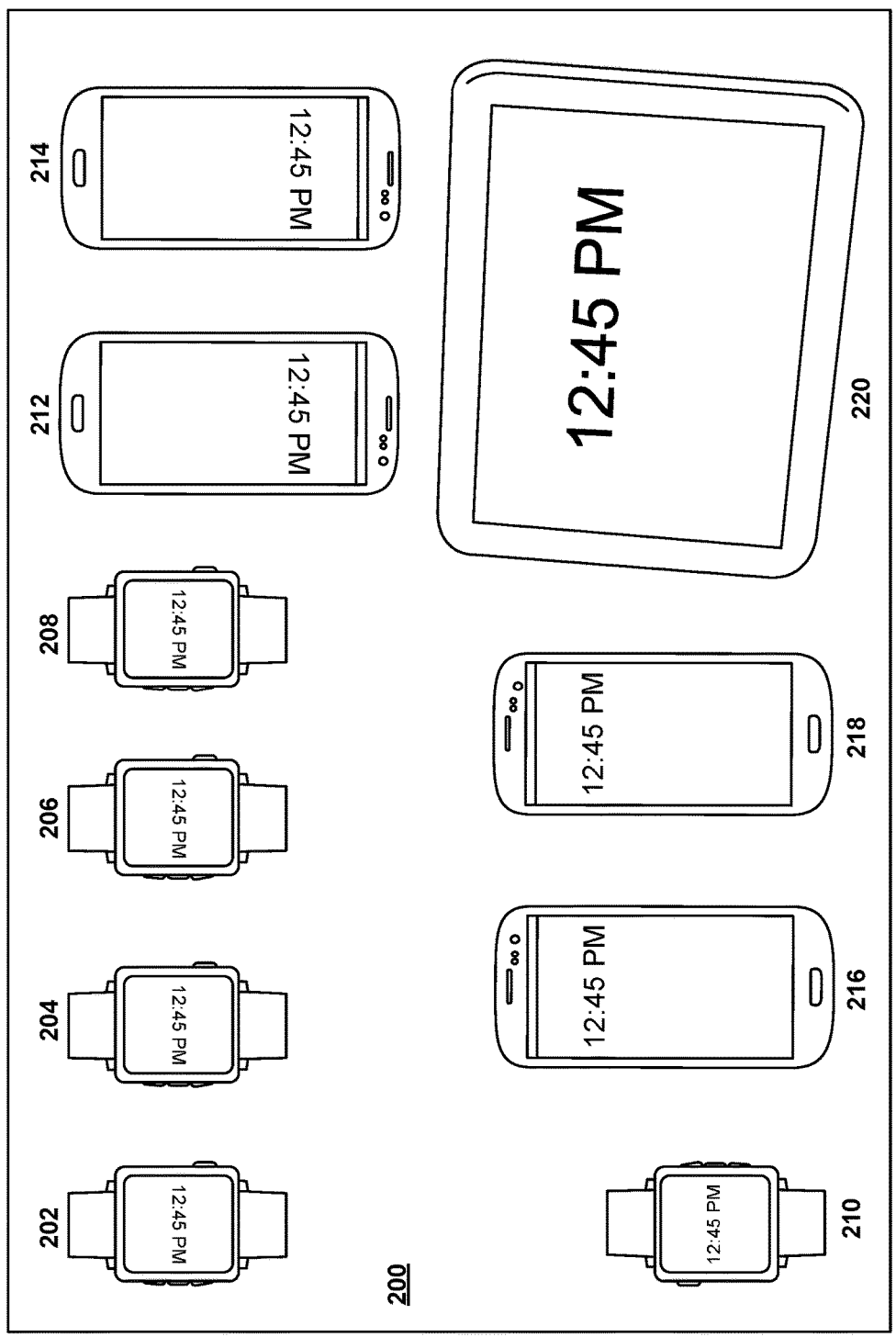
FIG. 2 illustrates an example spatial layout of computing devices, according to an example embodiment.

FIG. 2 illustrates an example product display kiosk 200. Kiosk 200 includes one table device 220, four smartphone devices 212, 214, 216, and 218, and five smartwatch devices 202, 204, 206, 208, and 210. Kiosk 200 may be located in a general electronics retail store, a specialized retail store, a mall, or any other location where prospective purchasers may be interested in interacting with or testing out computing devices. Kiosk 200 may, in some embodiments, include more or less of the computing devices 202-220 illustrated in FIG. 2. Further, computing devices on display in kiosk 200 may include other types of computing devices such as desktop computers, laptop computers, hybrid laptop-tablet computers, and televisions.

Computing devices 202-220 may operate independently of each other in order to allow multiple users to interact with the multiple devices available at kiosk 200. However, when at least some of the computing devices 202-220 are not actively being interacted with by users, the idle/unused computing devices may be used in a demo mode (e.g., floor mode, kiosk mode, etc.). Demo mode may be characterized by a device displaying visual representations of functionality and operations that the device is capable of performing (e.g., applications the computing device may be configured to execute).

For example, a device may display visual representations of functionality and operations available in a version of an application configured for execution by the device. In one example, the application may be an email application. Demo mode may show the device displaying a content of an email inbox, selecting and displaying individual emails, composing emails, and/or deleting emails. In another example, the application may be a video game. Demo mode may show gameplay of different levels of the video game. In a further example, the application may be a photo or video camera. Demo mode may show different pictures captured by the device to illustrate a quality with which the camera of the device may capture photos.

In some embodiments, demo mode may include a video showing the visual representations of functionality and operations available in the version of the application configured for execution by the device. The video may include a screen capture of activities performed within the application by a user (e.g., video of the device display output). The video may additionally or alternatively depict a user performing the activities within the application (e.g., video of the user performing various gestures for triggering the activities). In other embodiments, demo mode may include running the version of the application configured for execution by the computing device (e.g., executing the instructions making up the application). A server device, a master control device, and/or a control system thereof may provide a series of instructions to cause the computing device to launch a particular application and perform various activities within the application. The visual representations of functionality and operations may include various user interface states and animations that may be visible to a user viewing or interacting with the application on the computing device.

Since the computing devices come in different form factors and offer different hardware capabilities, the computing devices may be configured to execute different versions of a same application. For example, an email application may offer different functionality, may have a different appearance, and may be associated with different user interface gestures on devices with different form factors and/or hardware capabilities. In order to inform prospective purchasers of how different versions of an application look and function on computing devices of different form factors, multiple computing devices of different form factors may be configured to synchronously/simultaneously display visual representations of the same activities within the different versions of the application adapted to the different form factors and/or hardware capabilities of the multiple devices.

IV. Example Operations

Figure 3:
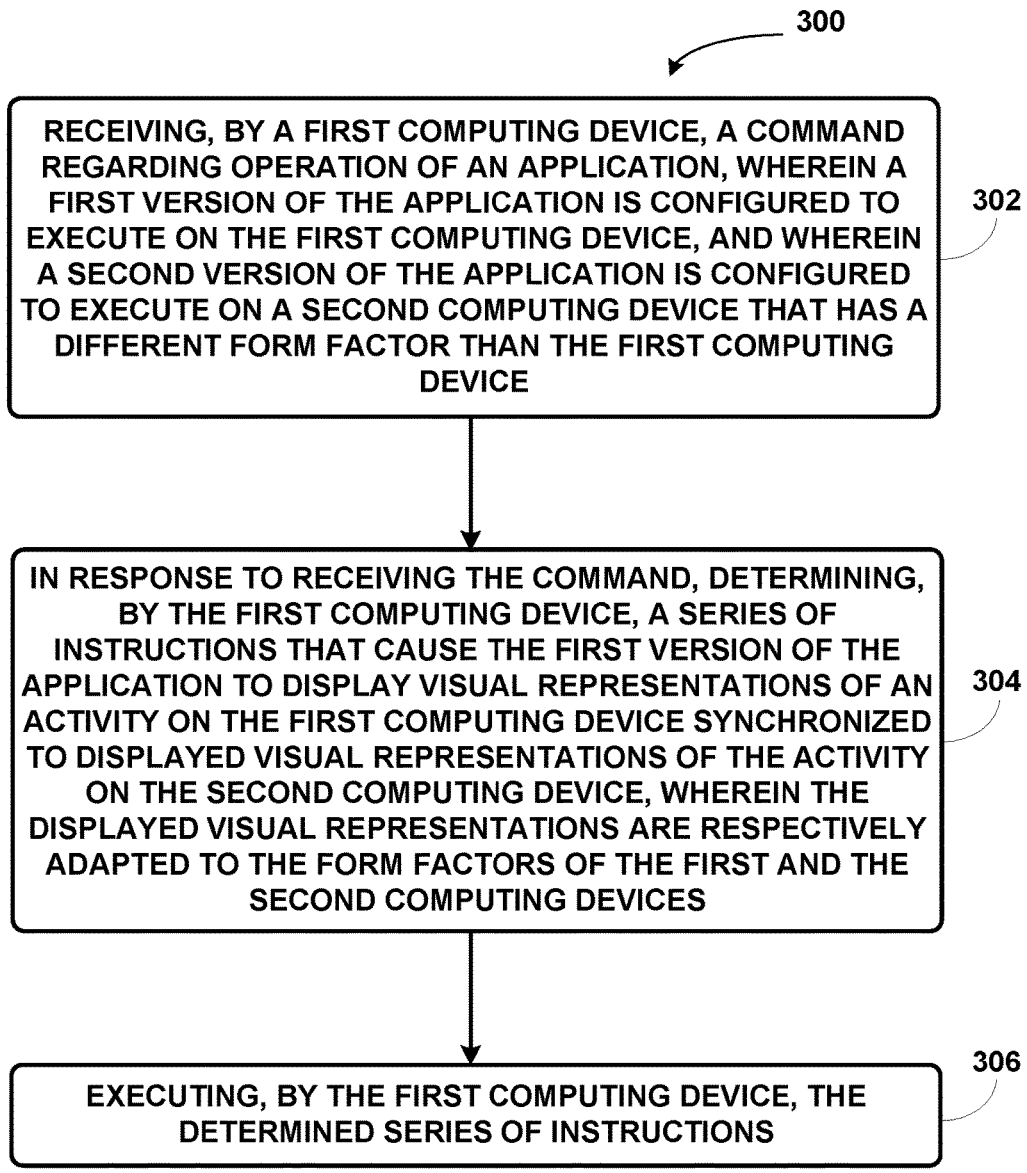
FIG. 3 illustrates example operations, according to an example embodiment.

Flow diagram 300 of FIG. 3 illustrates example operations that may be performed by a first computing device to display, in synchrony with at least one other computing device, visual representations of an activity in a version of an application stored on the first computing device. Performance of the operations may illustrate the differences in functionality and visual appearance of activities/operations in the application between a version of the application configured for execution by and adapted to a form factor of the first computing device and a version of the application configured for execution by and adapted to a different form factor of the at least one other computing device.

In block, 302, a first computing device may receive a command regarding operation of an application. A first version of the application may be configured to execute on the first computing device. A second version of the application may be configured to execute on a second computing device that has a different form factor than the first computing device. Within examples, the application may be a computer program or software designed to perform a group of coordinated operations, tasks, or activities. The application may comprise instructions stored on a non-transitory computer readable storage medium that may be executed by a processor to perform the group of coordinated functions, tasks, or activities.

The command received by the first computing device may be provided by, for example, a server device or a master computing device communicatively connected to the first computing device. In some examples, the command may instruct to the first computing device to launch the application. The command may also instruct to the first computing device to perform an operation, task, or activity within the application. The command may also be provided to one or more other devices, including the second computing device, to synchronize the displayed representations of the operation, task, or activity within versions of the application on the other devices with the version of the application on the first computing device.

In block 304, in response to receiving the command, the first computing device may determine a series of instructions that cause the first version of the application to display visual representations of an activity on the first computing device. The visual representations of the activity on the first computing device may be synchronized to displayed visual representations of the activity on the second computing device. The displayed visual representations may be respectively adapted to the form factors of the first and the second computing devices.

The first version of the application may be adapted to the form factor and/or hardware capabilities of the first computing device. Similarly, the second version of the application may be adapted to the form factor and/or hardware capabilities of the second computing device. Within examples, a version of an application adapted to a form factor and/or hardware capabilities of a particular computing device (e.g., the form factor adapted version of the application) may be configured to take input from sensors on the particular computing device (e.g., touch screen, IMU's, microphones, etc.). The form factor adapter version of the application may also include a user interface layout/appearance tailored to a size of the display of the particular computing device. The form factor adapted version of the application may further include instructions adapted for execution by the specific processing hardware included in the particular device. Accordingly, version of the application adapted to the form factor of the particular computing device may produce/display visual representations of an activity within the application adapted to a form factor of the particular device.

In block 306, the first computing device may execute the determined series of instructions. Executing the determined series of instructions may result in the first computing device and the second computing device simultaneously displaying respective visual representations of the activity to show the differences in the visual appearance of the activity on the form factors of the first and second computing device.

In some embodiments, the functions, operations, and activities may correspond to activities with an operating environment of a particular computing device (e.g., browsing the list of available applications on a home screen of the device). For example, the activities may illustrate how to adjust various settings (e.g., volume, brightness, theme, wallpaper) across computing devices with different form factors, how to navigate the through a home screen of the computing devices to launch different applications, and/or how to use an application store to download additional applications onto the computing devices.

When a particular version of an application is lacking functionality corresponding to a particular activity, the computing device may be configured to display an indication informing a prospective purchaser of the lacking functionality. For example, a smartwatch might not be equipped with camera hardware for capturing photos or videos. Thus, when a smartphone or tablet equipped with a camera are displaying visual representations of a photo/video capturing process, the smartwatch may display a prompt indicating that the smartwatch does not include a camera.

In some embodiments, the first computing device may receive additional commands regarding the operation of the application. In response to receiving the additional commands, the first computing device may determine an additional series of instructions to execute to cause the first version of the application to display visual representations of additional activities on the first computing device. The visual representations of the additional activities may be synchronized to displayed visual representations of the additional activities of the second computing device. The displayed visual representations may be respectively adapted to differentiate between visual appearances of the additional activities on the form factors of the first and the second computing devices. The first computing device may subsequently execute the determined additional series of instructions.

In another example embodiment, an additional series of instructions may be determined that cause the first version of the application to display visual representations of a first user interface gesture. The first user interface gesture may trigger performance of the activity on the first computing device. The displayed visual representations of the first user interface gesture may be synchronized to displayed visual representations of a second user interface gesture on the second computing device. The second user interface gesture may trigger performance of the activity on the second computing device. The first user interface gesture may be adapted to the form factor of the first computing device and the second user interface gesture may be adapted to the form factor of the second computing device. The determined additional series of instructions may be executed by the first computing device to cause performance of the corresponding operations.

In a further example embodiment, the form factor of the first computing device may include a first set of hardware modules. The form factor of the second computing device may include a second set of hardware modules different from the first set of hardware modules. The first version of the application may be adapted to hardware capabilities of the first set of hardware modules. The second version of the application may be adapted to hardware capabilities of the second set of hardware modules. A version of the application adapted to hardware capabilities of a set of hardware modules may be configured to utilize at least a portion of the available input devices/sensor, output devices, memory capacity, and processing power. The version of the application may be further configured to utilize operating system commands and operations of the operating system adapted to the form factor of the second computing device.

In some example embodiments, the form factor of the first computing device and the form factor of the second computing device may each be selected from the group consisting of a personal computer, a laptop computer, a tablet, a phone, a watch, and a television.

V. Example Activities within an Application

Figure 4:
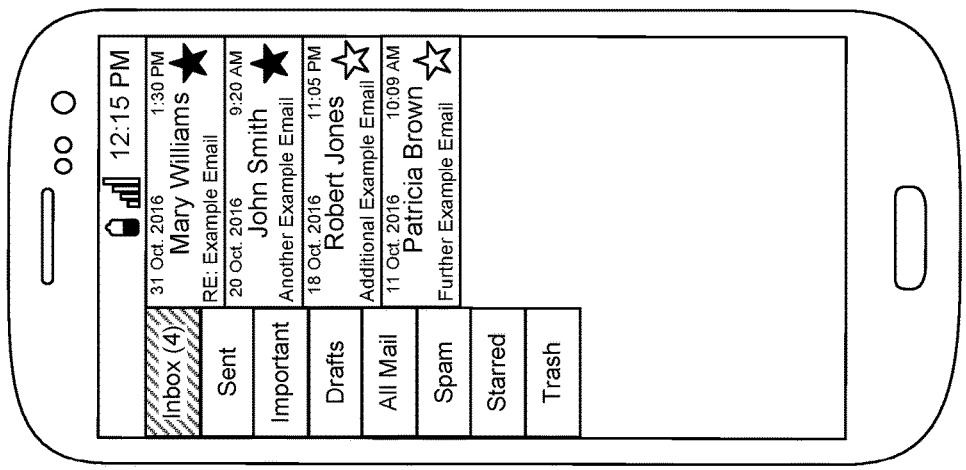
FIG. 4 illustrates visual representations of an email inbox, according to an example embodiment.
Figure 4:
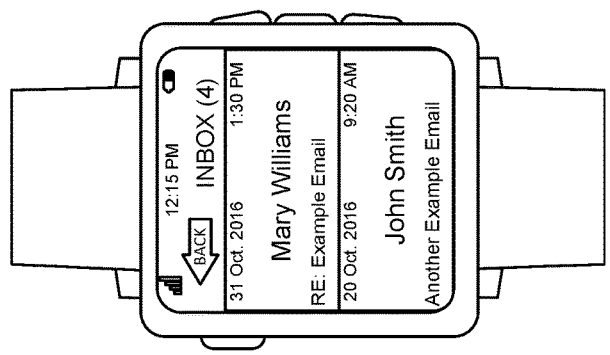

FIG. 4 illustrates an example of visual representations of an activity that may be performed within an application. Specifically, FIG. 4 illustrates a first computing device 400 having a form factor of a watch and a second computing device 402 having a form factor of a phone. A computing device having a form factor of a phone may be herein referred to as a smartphone. Similarly, a computing device having a form factor of a watch may be herein referred to as a smartwatch. The smartwatch may include a processor, a memory, a display, and one or more buttons. The processor may be configured to execute one or more applications stored in the memory. The display and buttons may allow a user of the smartwatch to interact with the smartwatch. In some embodiments, the smartwatch may include a strap for donning the watch by a user.

Smartwatch 400 may be configured to execute a version of an email application adapted to a form factor of the smartwatch 400. Likewise, smartphone 402 may be configured to execute a version of the application adapted to a form factor of the smartphone 402. Each of computing devices 400 and 402 is shown displaying, in an email application, the contents of an email inbox. In particular, both computing devices 400 and 402 are displaying the content of a same email inbox to illustrate the differences in the visual representations of the same email inbox due to the different form factors of each device.

A display of the email inbox on smartwatch 400 includes, at the top of the smartwatch screen an indication that the inbox contains four unread messages. However, due to a size of the screen of the smartwatch 400, smartwatch 400 might only be capable of displaying two of the four unread emails, as illustrated in FIG. 4 (e.g., only the email from Mary Williams and the email from John Smith are shown in the screen of smartwatch 400). In contrast, due to the screen of smartphone 402 being larger than the screen of smartwatch 400, smartphone 402 may be capable of displaying all four unread emails at once (e.g., the emails from Mary Williams, John Smith, Robert Jones, and Patricia Brown).

In some embodiments, the size of the screen of smartphone 402 may be large enough to display, in addition to the list of unread emails, a list of buttons corresponding to the different mailboxes/folders with the email application (e.g., inbox, sent, important, drafts, all mail, spam, starred, trash, etc.). Selecting one of the mailboxes/folder buttons may display the contents of the mailbox/folder while continuing to display the list of buttons. For example, FIG. 4 shows smartphone 402 displaying the "inbox," "sent," "important," "drafts," "all mail," "spam," "starred," and "trash" buttons while displaying the content of the email inbox. The "inbox" button is shown highlighted to illustrate which mailbox/folder is currently displayed.

In contrast, the screen of smartphone 400 may be too small to simultaneously display the multiple mailbox/folder buttons along with the contents of the email inbox. Accordingly, smartwatch 300 includes a "back" button, indicated by a left-facing arrow, that may be selected to move the email application to a menu screen where the different mailboxes/folders may be selected.

Additionally, in the view of the inbox, smartphone 402 may include a "star" function that may be lacking in the inbox view on smartwatch 400. The "star" functionality, as shown in the user interface of smartphone 402, may allow a user to label certain email messages as important by touching the star icon. In order to star and email on smartwatch 400, a particular email might first need to be selected from the inbox. The selected email may subsequently be displayed on the entirety of the smartwatch screen. The "starred" functionality may be accessible on smartwatch 400 only once the particular email is displayed on the entirety of the screen due to size limitations of the smartwatch screen. In contrast, due to the screen of the smartphone 402 being larger than the screen of smartwatch 400, smartphone 402 may display the star icon that triggers the "starred" functionality directly in the inbox view (e.g., a particular email might not need to be selected to star the particular email).

Displaying visual representations of activities such as, for example, the content of an email inbox, synchronously by multiple computing devices of different form factors may clearly and/or noticeably illustrate the differences between versions of the application corresponding to the different form factors. The clear and/or noticeable illustration of the differences between different version of the application on devices of different form factors may allow prospective purchasers to make a more informed decision about whether or not to purchase a particular device. Additionally, the synchronized visual representations may be used as a teaching/tutorial tool to show users familiar with using the first device how to perform the same or analogous operations on a second device having a different form factor. For example, a user may be able to perform actions on smartphone 402 to see how to perform the same or corresponding actions on smartwatch 400 (e.g., the user may be familiar with using smartphone 402 but may have never before used smartwatch 400).

VI. Example Networked Implementations

In some example embodiments, at least two synchronized computing devices configured to perform the operations herein described may be communicatively connected to a server device or a master control device. The server device may be configured to provide to each of the computing devices commands regarding operation of the application in order to synchronize the two computing devices in displaying the visual representations of actions within an application.

Figure 5:
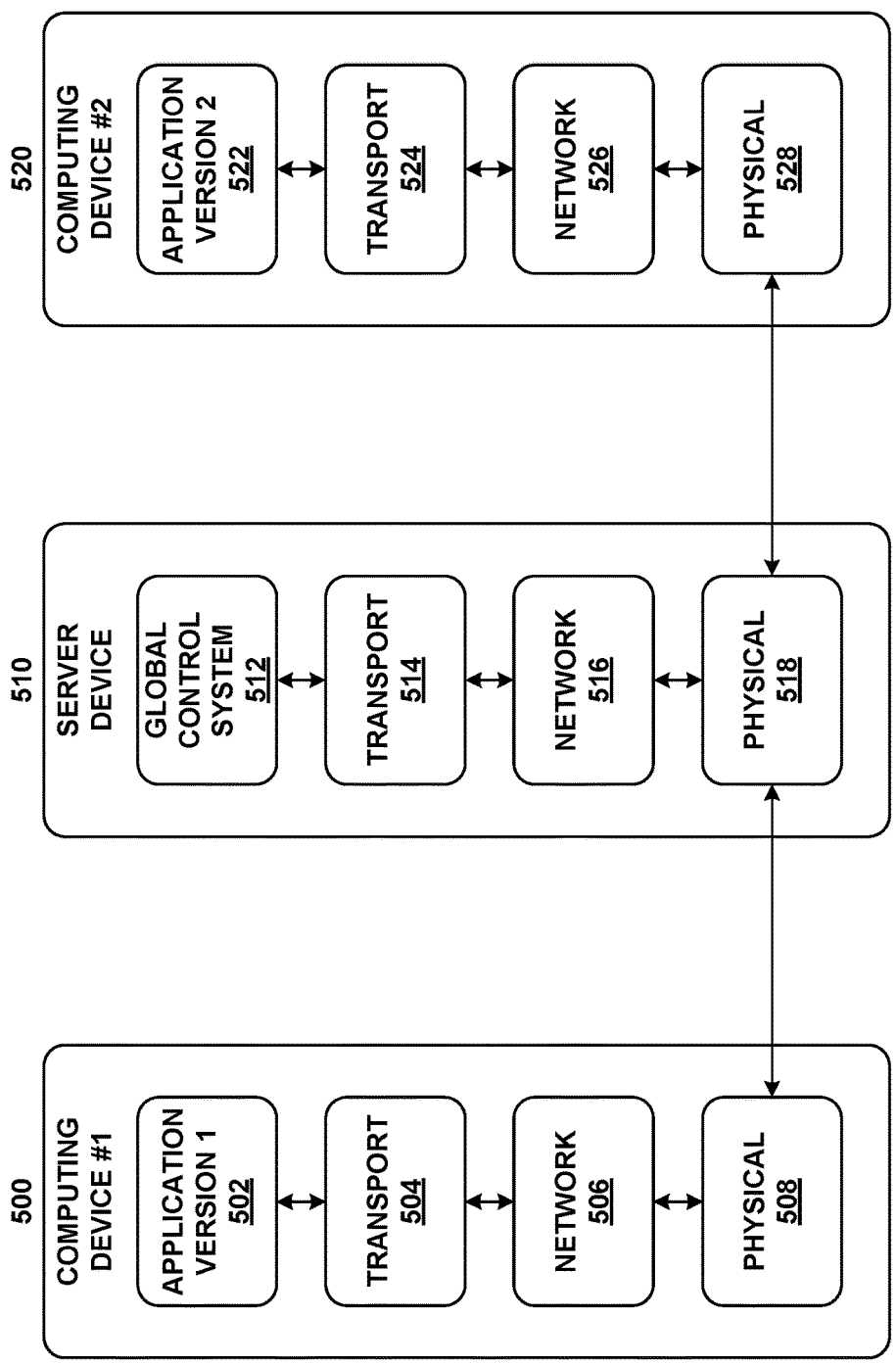
FIG. 5 illustrates a server connected to computing devices, according to an example embodiment.

FIG. 5 illustrates a block diagram illustrating example interconnections for coordinating operations of a first computing device 500 and a second computing device 520. Operations of computing devices 500 and 510 may be coordinated by instructions provided by server device 510. Specifically, each of computing device 500 and 510 may include a corresponding version of at least one application 502 and 522, respectively, adapted to respective form factors of each device. Each of computing devices 500 and 510 may include physical layer hardware 508 and 528, respectively, for communicating with physical layer hardware 518 of server 510. The physical layer hardware may implement a wireless connection according to various communication standard such as, for example, Wi-Fi, or LTE. Computing devices 500 and 520 may be connected to server 510 through a wireless access point. In some embodiments, the interconnection between server 510 and computing devices 500 and 520 may be a wired connection implemented via, for example, an Ethernet connection.

Server 510 may include a global control system 512 configured to coordinate operations of applications 502 and 522. For example, global control system 512 may be configured to provide the command regarding operation of the application to each of computing device 500 and 520 (e.g., command to launch an email application, display contents of the email inbox, compose emails, etc.). Exchange of data between applications 502 and 522 and global control system 512 may involve a transport layer (504 and 524, respectively) and a network layer (505 and 526, respectively) implemented in an operating system of the respective devices.

In order to send data to application 502, global control system 512 may provide, to an operating system of the server device 510, instructions to send the data to application 502 on device 500. Transport layer 514 and network layer 516, implemented in the operating system, may establish a connection to device 500 (e.g., open a socket) and may packetize the data for delivery to device 500. Physical layer 518 may transmit the packetized data to physical layer 508 of device 500. Similarly, transport layer 504 and network layer 506, implemented in the operating system of device 500, may manage the other end of the connection with server 510 and may reassemble the packetized data. The reassembled data may be provided to application 502. A similar flow of information may be followed for server 510 to communicate with computing device 520.

In some implementations, server 510 may be connected to computing devices 500 and 520 through a local wireless connection. Specifically, wireless devices 500 and 520 may be configured to communicate with server 510 through a designated wireless access point that only provides a connection to the server 510. Server 510 may, in turn, be connected to the internet. Thus, server 510 may function as a gateway between the local network of computing devices 500 and 510 and the World Wide Web. Accordingly, server 510 may be used to limit particular operations within computing devices 500 and 520. For example, server 510 may prevent users from signing in to personal email accounts on computing devices 500 and 520 in order to prevent the display of a user's personal inbox from being propagated to the plurality of other user devices in in a display kiosk.

In order to synchronize the displayed visual representations of various activities on the first and second computing devices, both computing devices may need to simultaneously execute corresponding sets of instructions. However, when the command indicating the operation within an application is received from a server device (e.g., server 510) or a master control device through a network connection, differences in a network time delay between server 510 and device 500 and server 510 and device 520 may result in an asynchronous display of the visual representations. In order to ensure that the visual representation are displayed synchronously, server device 510 may be configured to determine a network time delay associated with each computing device to which the server device provides the command regarding operation of the application.

Figure 6:
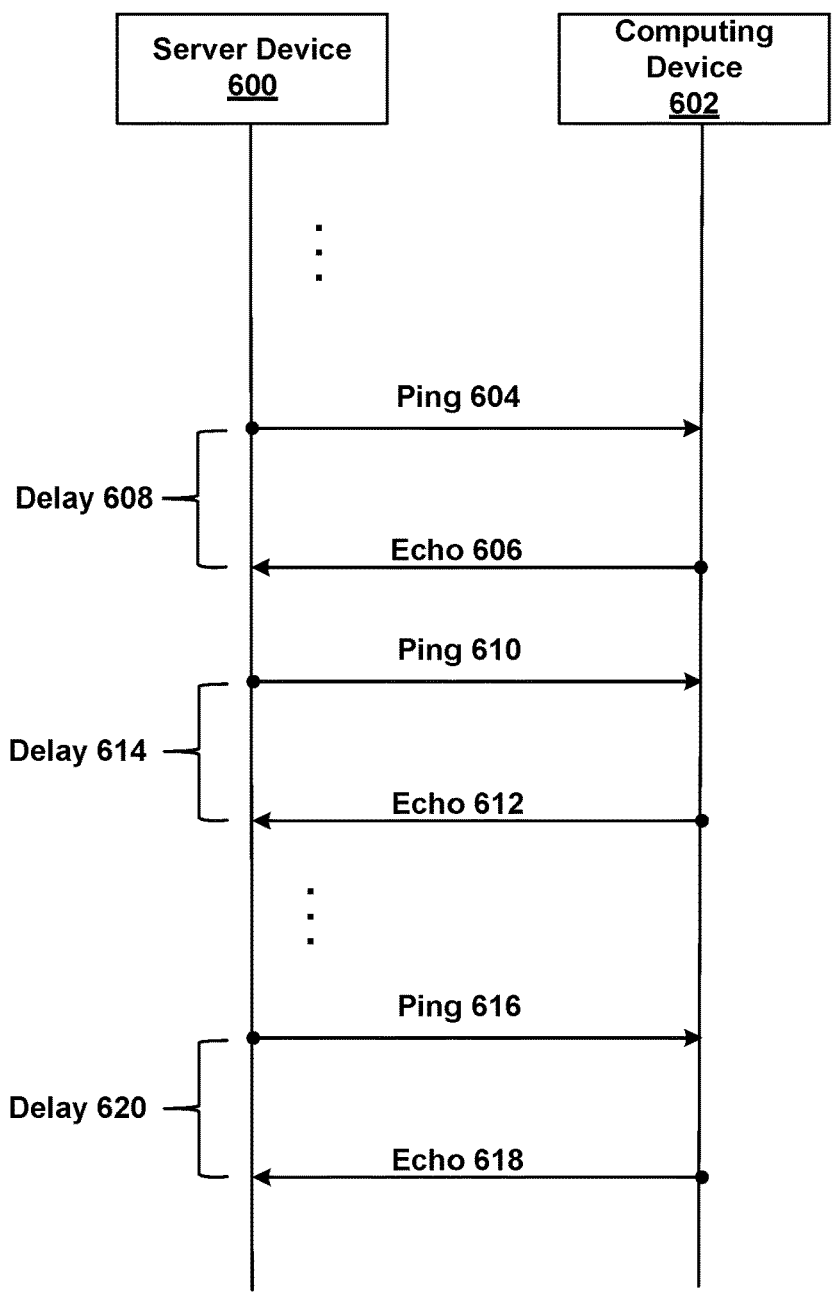
FIG. 6 illustrates operations for determining network time delay, according to an example embodiment.

FIG. 6 illustrates an example timing diagram illustrating operations for determining a network time delay between server device 600 and computing device 602. Computing device 602 may be one of many devices to which server 600 may be configured to provide commands regarding operation of versions of an application executed each of the many devices.

Specifically, server 600 may send ping 604 to computing device 602. Computing device 602 may, in response, send echo 606. Within examples, a ping may be a message sent over a network between at least two computing devices to determine a round-trip time from transmission of the ping to reception of the echo response to the ping. The ping message may instruct the ping recipient to respond to the ping sender with an echo message containing the same data payload as was contained in the original ping message.

Server device may determine the time delay 608 between transmission of ping 604 by server 600 and receipt of echo 606 by server 600. The time delay 608 may be divided in half to approximate the one-way network delay associated with sending data from server device 600 to computing device 602. The network time delay may include network latency as well as processing delay due to physical layer hardware on either end of the connection between server 600 and device 602.

Server 600 may repeat the ping process repeatedly over time to have an up-to-date metric of the network time delay. Specifically, server 600 may send ping 610, receive echo 612, determine delay 614 based on a timing of ping 610 and echo 612, and halve the time delay 614 to approximate the one-way network time delay. The process may be further repeated. Server 600 may send ping 616, receive echo 618, determine delay 620, etc.

Server 600 may keep a running/moving average of the past n (e.g., n=2, 3, 4, 5, 6 . . . ) two-way network time delays and/or one-way network time delays to more accurately determine the network time delay between server 600 and device 602. The moving average may serve as a filter to reduce the impact of outlier network time delays on the synchronous performance of the operations described herein. In some embodiments, the moving average may be a finite impulse response filter such as a weighted moving average. In other embodiments, the moving average may be an infinite impulse response filter such as an exponential moving average.

The network time delay determination process may be repeated for each computing device connected to server 600 that is configured to synchronously display the visual representations of activities within versions of the application executed by a respective computing device. Additionally, the server 600 (e.g., via a global control system thereof) may determine, for each computing device, based on a network time delay determined for each computing device, a local execution time for executing the determined series of instructions on a respective computing device. Executing the instructions at the determined local execution time may result in all of the devices displaying the visual representations of the activity in synchrony with each other.

In one embodiment, the first computing device and the second computing device, as described with respect to FIG. 3, may be communicatively connected through a wireless network. The first computing device may receive a first execution time for the determined series of instructions. The first execution time may be synchronized to a second execution time for a series of instructions for the second computing device. The first execution time may be based on a network time delay associated with the first computing device. The network time delay may be determined, for example, using the operations described with respect to FIG. 6. The first computing device may subsequently execute the determined series of instructions for the first computing device at the first execution time. Thus, the first computing device and the second computing device may display the visual representations in synchrony.

VII. Example Instructions for Performing Synchronized Operations

Figure 7:
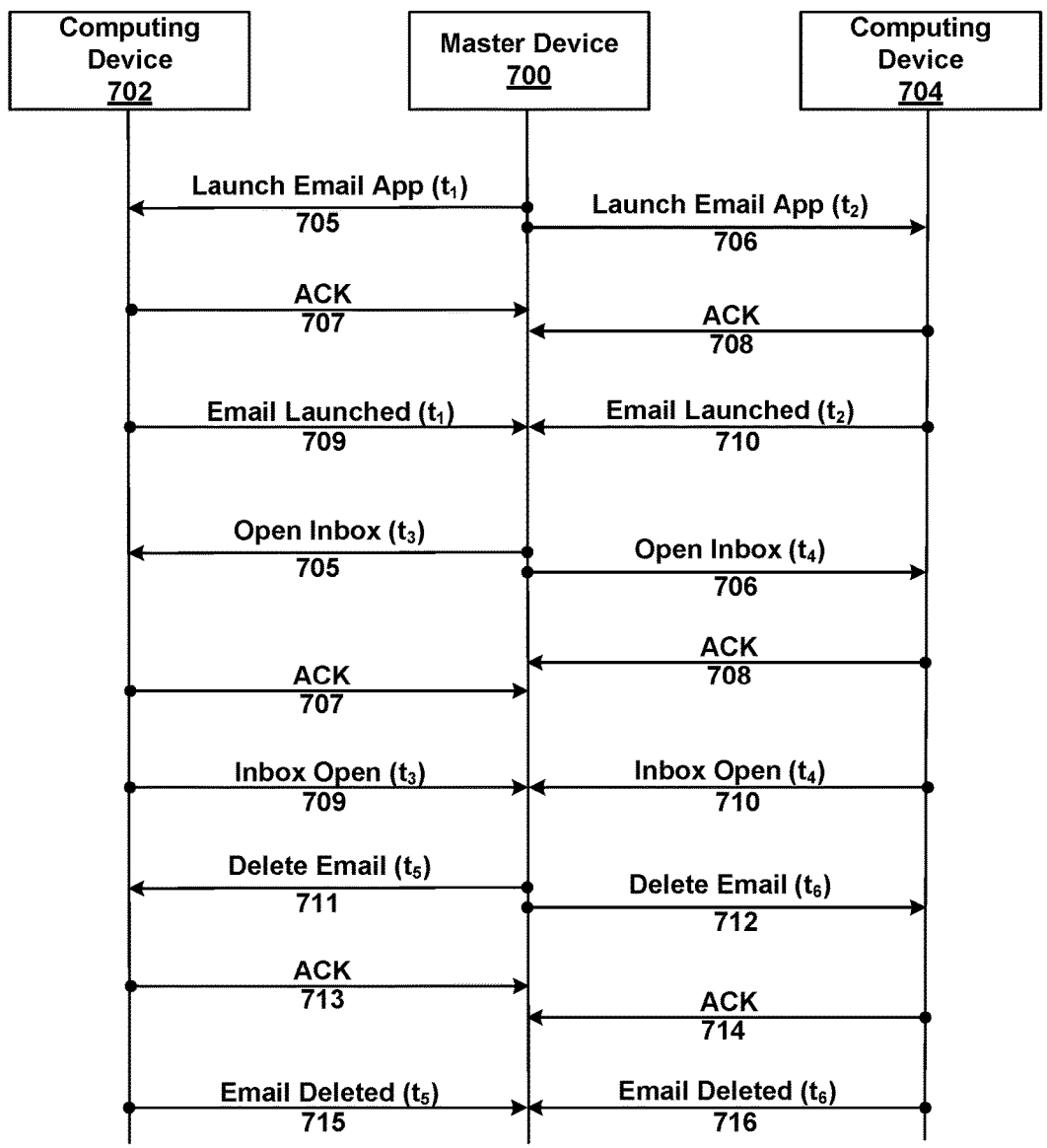
FIG. 7 illustrates operations for synchronizing activities of computing devices, according to an example embodiment.

FIG. 7 illustrates example instructions that may be exchanged between computing devices to synchronize operations of the respective versions of the application stored on the computing devices. In particular, FIG. 7 shows master control device 700 communicatively connected to computing device 702 and computing device 704. Master device 700 may be a server device configured to synchronize operations of the devices on display in a kiosk. Alternatively, master device 700 may be one of the devices on display in the kiosk. Master device 700 may be communicatively connected to computing devices 702 and 704 through a wired or wireless network connection. The network may be a wide area network (e.g., the Internet) or a local area network (e.g., local Wi-Fi network, local area via broadcast or multicast). Master device 700 may be configured to periodically or continuously determine the network time delay between master device 700 and computing device 702 and master device 700 and computing device 704, as described with respect to FIG. 6.

Master device 700 may transmit to computing device 702 command 705 instructing computing device 702 to launch the version of the email application stored on computing device 702. Command 705 may include a local execution time $t_1$ at which computing device 702 is to execute instructions corresponding to command 705. Computing device 702 may receive command 705 and may determine a series of instructions for carrying out the command. Computing device 702 may subsequently execute the determined series of instructions at the local execution time $t_1$.

In one example embodiment, an operating system of computing device 702 may be configured to receive command 705 and determine the series of instructions for launching the designated email application. In another example embodiment, computing device 702 may have stored thereon and/or be configured to execute specialized software that may, based on command 705, determine a series of instructions for executing command 705. The specialized software may take the form of or involve an application programming interface (API). The specialized software may, for example, simulate user input that would cause the computing device to launch the email application, as indicated by command 705. Simulating user input by the specialized software may provide to the operating system of computing device 702 or the email application signals indicative of user input without a user actually interacting with device 702. In a further example embodiment, the version of the email application stored on computing device 702 may be a demo version of the application (e.g., a version available only on the display model devices in the kiosk). The demo version of the application may be configured to receive command 705 and determine the series of instructions for executing the command. The demo version of the application may include the API. Other implementations may be possible.

Similarly, master device 700 may transmit to computing device 704 command 706 instructing computing device 704 to launch the version of the email application stored on computing device 704. Command 706 may include a local execution time $t_2$ at which computing device 704 is to execute instructions corresponding to command 706. The local execution time $t_2$ of computing device 704 may be synchronized with the local execution time $t_1$ of computing device 702 so that visual representations of launching the email application on each computing device appear simultaneously on each device.

Computing device 702 may receive command 705 and may determine a series of instructions for carrying out the command. Computing device 702 may subsequently execute the determined series of instructions at the local execution time. The series of instructions for carrying out the command may be determined by the operating system of computing device 704, specialized software on computing device 704, or by the particular version of the email application stored in computing device 704, as discussed above with respect to computing device 702.

In response to successfully receiving command 705, computing device 702 may send an acknowledgement message ACK 707. Similarly, in response to successfully receiving command 706, computing device 704 may send an acknowledgement message ACK 708.

Computing device 702 may execute the instructions corresponding to command 705 at time $t_1$. Computing device 704 may execute the instructions corresponding to command at time $t_2$. Execution of the instructions at the respective execution times may cause computing devices 702 and 704 to simultaneously display visual representations of launching the email application on each device. The completion of the launch of the email application on each of devices 702 and 704 may be communicated to master device 700 via messages 709 and 710, respectively.

The local execution times $t_1$ and $t_2$ (as well as times $t_3$, $t_4$, $t_5$, and $t_6$) may be expressed relative to local clocks of each of devices 702 and 704. Alternatively, times $t_1$ and $t_2$ may represent an amount of time that devices 702 and 704, respectively, must wait after receiving command 705 and 706, respectively, before executing the determined series of instructions corresponding to commands 705 and 706, respectively. Accordingly, times $t_1$ and $t_2$ may be different (e.g., due to different network time delays associated with devices 702 and 704). However, execution of the determined series of instructions at times $t_1$ and $t_2$ may result in simultaneous execution of the instructions on each device (e.g., the email app may appear to a viewer of the devices to be launched at the same time on both devices). Thus, messages 709 and 710 are shown as sent at approximately the same times to indicate the simultaneous execution of the determined instructions. In other words, the times $t_1$ and $t_2$ may account for a clock skew and different network time delays associated with each of devices 702 and 704. Executing the determined instructions at times other than $t_1$ and $t_2$ may cause the launching of the email application to appear desynchronized or out of phase on the two devices (e.g., one device may launch the email application sooner than the other device, thus breaking the synchrony).

Once the email application has been launched, master device 700 may provide additional commands 705 and 706 indicating to devices 702 and 704, respectively, to open the inbox within a version of the email application at respective local execution times $t_3$ and $t_4$. In response to receipt of commands 705 and 706, computing devices 702 and 704 may provide acknowledgement messages 707 and 708, respectively. Computing devices 702 and 704 may determine respective series of instructions for performing the operations/activities indicated by the respective commands 705 and 706.

In one example, computing device 702 may be configured to execute the demo version of the application. The demo version of the application may be configured to open the email inbox in response to command 705. Specifically, demo version of the application may include an application programming interface (API) that takes as input command 705 and produces as output the series of instructions for causing the application to perform the activities/operations indicated by command 705 (e.g., opening the inbox and displaying the contents of the inbox). In some embodiments, the API may be implemented as a standalone specialized software stored on computing device 702. The API may be configured to interface with the operating system of computing device 702 and with additional applications other than the email application.

Computing devices 702 and 704 may execute the respective series of instructions at the respective local execution times $t_3$ and $t_4$ and may send respective confirmation messages 709 and 710 back to the master device 700. Execution of the respective instructions at respective local execution times $t_3$ and $t_4$ may result in devices 702 and 704 simultaneously displaying visual representations illustrating the process of opening the inbox, the visual appearance of the contents of the inbox on each device, as well as the user interface gestures for triggering the opening of the inbox on each device.

FIG. 7 further illustrates master device 700 providing a third set of commands 711 and 712 to devices 702 and 704, respectively. Commands 711 and 712 instruct the applications stored on devices 702 and 704 to delete a particular email from the inbox at corresponding local execution times $t_5$ and $t_6$, respectively. Devices 702 and 704 may send respective acknowledgement messages 713 and 714 indicating successful receipt of commands 711 and 712. Devices 702 and 704 may, as previously described, determine a series of instructions for performing the activities/operations indicated by commands 711 and 712, respectively. Devices 702 and 704 may subsequently execute the determined instructions at respective local execution times $t_5$ and $t_6$, thus resulting in simultaneous display of visual representations illustrating the process of deleting an email on each device. Devices 702 and 704 may provide messages 715 and 716, respectively, confirming execution of the instructions.

The email mailboxes displayed on each of devices 702 and 704 during the operations herein described may be local copies of a master mailbox stored on master device 700 or an external email server. Each of devices 702 and 704 might manipulate only local copies of the master mailbox in order to, for example, avoid the creation of duplicate copies of the same email. Specifically, if each of devices 702 and 704 were to send a same email (e.g., a demo email) through the email server, two copies of the same email might be created on the email server. Such duplicate operations might quickly clog up the email serves, especially if more than two devices are operating in demo mode.

Instead, operating on local copies of the master mailbox prevents the devices 702 and 704 from creating redundant entries on the email server. Master device 700 may provide commands to the external email server or itself execute instructions to update the master mailbox to reflect the operations provided to computing devices 702 and 704. In other words, master device 700 might be the only device to update the master mailbox to avoid creation of duplicate copies of email messages. Devices 702 and 704 may receive updates regarding the content of the master mailbox with each command provided by master device 700 (e.g., command 705, 706, 709, 710, etc.).

The messages exchanged between master device 700, computing device 702, and computing device 704 may be exchanged according to the operations described with respect to FIG. 5. Specifically, master device 700 of FIG. 7 may correspond to server device 510 of FIG. 5. Similarly, computing device 702 of FIG. 7 may correspond to computing device 500 of FIG. 5. Command 705 may originate in global control system 512. Global control system 512 may instruct transport layer 514 (e.g., operating system) of server 510 to open a socket connecting server 510 to device 500 (e.g., the server may request to connect to device 500). Device 500 may accept the connection requested by server 510. Alternatively, application 502 may instruct transport layer 504 of computing device 500 to open a socket connecting device 500 to server 510 and server 510 may accept the connection request.

With the connection established, global control system 512 may send command 705 to device 500 by writing data indicative of the command to the opened socket. The network layer 516 may packetize the data. The physical layer 518 may transmit signals representing the packetized data to device 500. Physical layer 508 of device 500 may receive the data. Network layer 506 may de-packetize the data. The de-packetized data may be read by application 502 from the open socket. A similar process may be followed for sending confirmation messages 707 and 709 from computing device 500/702 to master device 510/700.

Although FIG. 7 illustrates only three different commands (e.g., launch email application, open inbox, and delete email), additional commands may be possible and may vary depending on the type of application. For example, the email application may further include commands like "Open Sent Mailbox," "Compose New Email," and "Show Contacts," among other possibilities. In particular, when the application is an email application, the activity of which visual representations are shown may be selected from the group consisting of displaying a content of an email inbox, composing an email, displaying a received email, deleting an email, and displaying a list of contacts.

In another example, a video player application may include commands such as "Play Video Starting at Time t," "Pause Video," and "Rewind Video," among other possibilities. Specifically, when the application is a video player application, the command regarding operation of the application may include instructions to display a synchronized animation across the first computing device and the second computing device (e.g., computing device 702 and 704). Other types of applications and other types of corresponding commands may be possible.

VIII. Additional Example Operations

In some embodiments, the operations described herein may be performed by the computing devices automatically. Specifically, the computing devices may be configured to operate in a demo mode. A master/server device may periodically provide commands to the devices to cause the devices to display visual representations of multiple activities to illustrate at least a portion of the activities and operations available in an application. The commands may be provided periodically and/or in a loop, as described with respect to FIG. 7.

In response to user interaction with a particular computing device operated in the demo mode, the particular device may exit demo mode and cease to display the synchronized visual representations. The particular device may allow the user to explore the features of a version of the application configured for execution by the particular computing device while the other computing devices remain in demo mode and continue to display the synchronized visual representations. Specifically, an input signal indicative of a user interaction with the particular computing device may be received from a user interface of the particular computing device. In response to receiving the input signal the particular computing device may cease to execute the determined series of instructions while at least one other computing device continues to display visual representations of the activity on the at least one other computing device.

In alternative embodiments, an input signal indicative of an activity on a particular computing device may be received from a user interface of the particular computing device. A representation of the input signal may be transmitted to at least one other computing device to cause a version of the application on the at least one other computing device to display visual representations of the activity on the at least one other computing device. The visual representations of the activity on the at least one other computing device may be synchronized to displayed visual representations of the activity on the particular computing device. The representation of the input signal may be transmitted to the at least one other computing device by the particular computing device directly (e.g., the particular computing device may enter a master device mode configured to synchronize operations of the particular computing device and the at least one other computing device) or via a server communicatively connected to the computing devices.

The user input may include activities within a particular application on the particular computing device. For example, user input may comprise a user opening an email application, viewing a content of the email application, composing a new email, and/or deleting emails from the email inbox. Alternatively, the user input may include activities within an operating system environment (e.g., home screen) of the particular computing device.

In some embodiments, the indication of the user input may be transformed into a general command regarding operation of the application. Specifically, indication of a user performing a series of user interface gestures to delete an email may be transformed by the master/server device into a more general "Delete Email" command. The general "Delete Email" command may be broadcast to and interpreted by the computing devices as described with respect to FIG. 7.

In response to receiving the indication of user input or the command corresponding to the user input, the other computing devices may be configured to synchronously display visual representations of the activity triggered by or corresponding to the user input. The visual representations may be displayed in versions of the application corresponding to respective form factors of the other computing devices. Additionally, the other computing devices may be configured to display visual representations of user interface gestures that trigger performance of the activity indicated by the user input. Each computing device may display visual representations of user interface gestures adapted to a form factor of a respective computing device.

For example, a smartphone, watch, or tablet may display visual representations of touch screen gestures and gestures indicating a repositioning of the device in space (e.g., tilting, shaking). A desktop or laptop computer may display visual representations of mouse or touchpad gestures. A television may display visual representations of buttons to press on a remote control of the television.

In particular, the master/server device, may transmit the indication of user input or the command corresponding to the user input to the other computing devices, as described with respect to FIGS. 5 and 7. The versions of the application stored on each of the other devices may be configured to determine, based on the received indications or commands, instructions for performing the activities/operations associated with the received indications or commands, as described with respect to FIG. 7. For example, a version of an email application on a laptop may, in response to a "Delete Email" command, display the mouse cursor moving over the particular email to be deleted, the mouse cursor clicking on the particular email, and the mouse cursor dragging the particular email over the trash icon/folder. Further, the laptop may display a visual representation of a finger manipulating a trackpad of the laptop to control the mouse cursor to perform the corresponding movements and actions of the cursor.

The displayed visual representations of the user interface gestures may be animations of the gestures overlaid on top of or integrated within the application. Alternatively, the visual representations of the user interface gestures may include a video showing a user performing the gestures on the respective device. The video may be played in a portion of a screen of each device (e.g., the video may be overlaid on top of a portion of the application to allow a viewer to see both the video of the gesture as well as the corresponding response triggered in the application by the gesture). Accordingly, the user of the particular computing device may be able to see how to perform the same operation across the different form factors of computing devices available to the user.

In another example embodiment, a demo mode of a plurality of computing device may include an animation or video displayed on the plurality of computing devices according to a spatial layout of the computing devices. The spatial layout may be, for example, the spatial layout illustrated in FIG. 2. The animation or video may comprise, in one example, a ball bouncing and/or rolling between the screens of the plurality of computing devices 202, 204, 206, 208, 212, and 214. For example, watch 202 may show an animated character rolling the ball towards the right. The devices may be synchronized according to the operations described herein to illustrate the ball rolling sequentially from watch 202 to phone 214 across watches 204-208 and phone 212. Phone 214 may show another animated character catching the ball after the ball has been shown rolling through the screens of devices 202-212.

In some embodiments, the animation may be a game. A user may use device 202 or device 214 to provide input to play the game. The input may cause the animated character shown on either device 202 or 214 to throw or catch the ball. The video, animation, and/or game may be used to attract the attention of prospective purchasers of the computing devices.

The video, animation, or game may be synchronized as described with respect to FIG. 7. In particular, master device 700 may be provided with an indication of the spatial layout of devices 202, 204, 206, 208, 212, and 214. For example, an operator of the kiosk may use a user interface to drag and rearrange a virtual representation of the layout of devices 202, 204, 206, 208, 212, and 214 to match the actual physical arrangement of devices 202, 204, 206, 208, 212, and 214 in the kiosk. Accordingly, based on the rearranged virtual representation, master device 700 may determine, for each device, a video/animation to display and a local time at which to display the video/animation to create the desired visual effect (e.g., a ball rolling or bouncing from screen to screen).

For example, to illustrate a ball rolling from screen of device 202 to screen of device 204, the master device 700 may send to device 202 a command to play, at global time t, a video of a ball rolling. If the video is 2 seconds long (e.g., it takes 2 second for the ball to roll across the screen of device 202), master device may send to device 204 a command to play the video of the ball rolling at global time t+2. Master device 700 may determine local execution times for computing devices 202 and 204 corresponding to global times t and t+2, respectively.

In order to illustrate the ball bouncing, each device may be commanded to play a different video at corresponding, synchronized time offsets. Alternatively, instead of playing the video, each device may instead display an animation of the ball synchronized among the devices in the same manner as the video.

The devices may be grouped into a plurality of groups or clusters configured to perform different sets of operations. For example, devices 202, 204, 206, 208, 212, and 214 may display the game/video/animation discussed above while devices 210, 216, 218, and 220 display visual representations of actions within an email application. Accordingly, the content displayed on each cluster of devices may be tailored to a particular demographic of prospective purchasers of the computing devices.

IX. Example Device Popularity Monitoring

In some instances, it may be desirable to determine the relative popularity of multiple computing devices. With this information, one may adjust a type and a number of the computing devices in order to reflect a level of user preference/interest for the different types (e.g., form factors) of computing devices. In particular, a computing device and/or a server device may monitor, for at least a first computing device and a second computing device, a frequency of user interaction with each computing device or a duration of user interaction with each computing device. The frequency and duration of interaction may be determined for each application configured for execution by the computing device and/or for the computing device as a whole (e.g., across all applications).

The frequency of interaction may be monitored by monitoring software configured for execution by the computing devices. The monitoring software may, for example, include counters that track the number of times a particular application is launched, the number of times the computing device receives user input, and/or the number of times the computing device is woken up from sleep mode or demo mode, among other possibilities. Similarly, duration of user interaction may be logged by different timers configured to monitor the duration of time spent interacting with a particular application or duration of time spent on the home screen of the computing device. For example, user input may trigger a particular timer to start (e.g., a user waking the device from sleep mode or a user launching a particular application). Absence of user input for more than a threshold amount of time may trigger the particular timer to stop. The device may be considered "in use" between the start and stop times. In some embodiments, demo versions of each application may have integrated therein the timers and counters for monitoring user interaction frequency and duration, respectively.

The frequency and duration data logged by each device may be periodically uploaded to a master/server device for analysis. The upload process may be performed periodically (e.g., every two hours) or continuously (e.g., updates may be pushed to master/server each time a value of a counter or timer changes).

It may be determined that the first computing device is more popular than the second computing device based on the monitored frequency of the user interaction with the first computing device being higher than the monitored frequency of the user interaction with the second computing device. Alternatively or additionally, it may be determined that the first computing device is more popular than the second computing device based on the monitored duration of the user interaction with the first computing device being higher than the monitored duration of the user interaction with the second computing device. The determination may be performed by a master device or server device communicatively connected to the two or more computing devices.

In one embodiment, the determined relative popularity of multiple computing devices may prompt the computing devices to be repositioned or reorganized within a display kiosk. A prompt to swap the position of at least two devices may be displayed by at least one of the computing devices in the product display kiosk. Alternatively, the prompt may be displayed by a computing device external to the product display kiosk such as a client device used by an operator of the kiosk (e.g., a laptop or tablet used by the kiosk operator to manage the kiosk devices). A server configured to synchronize operations of the displayed devices and/or an additional other server may transfer the data indicating the prompt to the intended destination (e.g., the computing device external to the kiosk). An operator of the kiosk may, in response to the prompt, physically reorganize the computing devices according to the provided prompt. Further, the kiosk operator may be prompted and may, in response, adjust the position and orientation of the kiosk within an environment (e.g., a store or mall).

The position of an unpopular computing device may be swapped with a position of a popular computing device. If the popularity of the popular device is due to a position of the device within the kiosk (e.g., the popular device is more noticeable to potential users as they pass the kiosk), swapping the positions of the devices may allow the unpopular device to be more noticeable to people, thus increasing the probability that additional potential users will interact with the device. The popularity of various device types (e.g., form factors) across a plurality of kiosks may be aggregated to account for the effect of kiosk positioning within an environment and device positioning within a kiosk. Specifically, the aggregate popularity data may be used to more accurately determine whether a device is unpopular due to a location/position of the device or a form factor/features of the device.

In other embodiments, a prompt may be provided to swap an unpopular device for a new computing device (e.g., swap one computing device for another computing device). The new computing device may have a same form factor and/or hardware configuration as at least one popular device of the plurality of computing devices. Thus, unpopular devices may be removed from the product display kiosk and may be replaced with more popular devices that more closely reflect the interests of prospective purchasers.

In another embodiment, instead of or in addition to adjusting device position or adjusting the types of devices on display, the computing devices may be configured to, in response to the determined relative popularity, adjust a volume, brightness, and/or color of the content displayed on one or more computing devices. For example, volume or brightness may be increased on unpopular devices and decreased on popular devices to attract more attention to the unpopular devices. Similarly, unpopular devices may be configured to use more colors and/or brighter colors to display the visual representations of activities on the unpopular devices. Alternatively, volume, brightness, and/or the color palette of the visual representations on popular devices can be augmented to attract more attention to the popular devices. Thus, the attention of prospective purchasers may be attracted to devices that the prospective purchasers are more likely to be interested in and/or purchase (e.g., the popular devices).

In a further embodiment, at least two devices having the same form factor may be configured to execute different versions of the same application. The computing devices may be located in close proximity to one another (e.g., in a product display kiosk). The different versions of the same application may be characterized by a different organization and visual appearance of the user interface (e.g., different button layout, different button shapes and colors, different number of buttons, different organizational hierarchy). Frequency and/or duration of user interaction with the different versions of the same application may be monitored to determine a preference of prospective purchasers for either version of the application (e.g., A/B testing of different versions of the application).

The different versions of the application may be modified and refined based on the determined preference/popularity of each version. Alternatively, in response to determining the preferences of the prospective purchasers, the more popular version of the application may be configured for execution on both computing devices.

The frequency and/or duration data may be logged and analyzed over time (e.g., both across different device types as well as different version of the application on the same device type). Additional data such as total store sales within a particular time span, the number of visitors to the store, the location and orientation of the kiosk within the store, geographical location of the store, and/or the number of devices of each type sold in a particular timespan in the store housing the display kiosk may be logged. The additional data may be used in combination with the frequency and/or duration of use data to more accurately determine relative device popularity as well as determine the reasons for why a particular device or a particular device type is more or less popular than other devices.

For example, sales of a particular type of device may be very high while the monitored frequency and/or duration of use may suggest that the particular device type is less popular than other devices. The additional sales data may be used to hypothesize and/or conclude that prospective purchasers are already convinced that they wish to buy the particular device type (e.g., the prospective purchasers already know how the smartphone they are buying looks and works and thus have no need to interact with the display model). This hypothesis and/or conclusion may be used to adjust the number of devices, types of devices, and/or types of applications on each of the devices that are available in the kiosk.

X. Conclusion

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The above detailed description describes various features and functions of the disclosed systems, devices, and methods with reference to the accompanying figures. In the figures, similar symbols typically identify similar components, unless context dictates otherwise. The example embodiments described herein and in the figures are not meant to be limiting. Other embodiments can be utilized, and other changes can be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

A block that represents a processing of information may correspond to circuitry that can be configured to perform the specific logical functions of a herein-described method or technique. Alternatively or additionally, a block that represents a processing of information may correspond to a module, a segment, or a portion of program code (including related data). The program code may include one or more instructions executable by a processor for implementing specific logical functions or actions in the method or technique. The program code and/or related data may be stored on any type of computer readable medium such as a storage device including a disk or hard drive or other storage medium.

The computer readable medium may also include non-transitory computer readable media such as computer-readable media that stores data for short periods of time like register memory, processor cache, and random access memory (RAM). The computer readable media may also include non-transitory computer readable media that stores program code and/or data for longer periods of time, such as secondary or persistent long term storage, like read only memory (ROM), optical or magnetic disks, compact-disc read only memory (CD-ROM), for example. The computer readable media may also be any other volatile or non-volatile storage systems. A computer readable medium may be considered a computer readable storage medium, for example, or a tangible storage device.

Moreover, a block that represents one or more information transmissions may correspond to information transmissions between software and/or hardware modules in the same physical device. However, other information transmissions may be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

What is claimed is:

1. A method comprising:
receiving, by a first computing device, a command regarding operation of an application, wherein a first version of the application is configured to execute on the first computing device, and wherein a second version of the application different from the first version is configured to execute on a second computing device that has a different form factor than the first computing device;
in response to receiving the command, determining, by the first computing device, a series of instructions that cause the first version of the application to display visual representations of an activity on the first computing device synchronized to displayed visual representations of the activity on the second computing device, wherein the displayed visual representations are adapted to differentiate between visual appearances of the activity in the first and the second versions of the application by displaying, in the first version of the application, a portion of a first arrangement of a first set of selectable icons for performing activities in the first version of the application, wherein the portion of the first arrangement is selected to maintain visual synchronization of the activity between the first and second computing devices, wherein the first set of selectable icons is different from a second set of selectable icons for performing the activities in the second version of the application, and wherein the first arrangement is different from a second arrangement of the second set of selectable icons in the second version of the application; and executing, by the first computing device, the determined series of instructions.

2. The method of claim 1, further comprising:
receiving additional commands regarding the operation of the application;
in response to receiving the additional commands, determining an additional series of instructions to execute to cause the first version of the application to display visual representations of additional activities on the first computing device synchronized to displayed visual representations of the additional activities of the second computing device, wherein the displayed visual representations are respectively adapted to differentiate between visual appearances of the additional activities in the first and the second versions of the application; and
executing the determined additional series of instructions.

3. The method of claim 1, further comprising:
receiving, from a user interface of the first computing device, an input signal indicative of the activity on the first computing device.

4. The method of claim 3, further comprising:
transmitting a representation of the input signal to the second computing device to cause the second version of the application to display visual representations of the activity on the second computing device, wherein the visual representations of the activity on the second computing device are synchronized to displayed visual representations of the activity on the first computing device.

5. The method of claim 1, the method further comprising:
determining an additional series of instructions that cause the first version of the application to display visual representations of a first user interface gesture that triggers performance of the activity on the first computing device, wherein the displayed visual representations of the first user interface gesture are synchronized to displayed visual representations of a second user interface gesture on the second computing device, wherein the second user interface gesture triggers performance of the activity on the second computing device, and wherein the first user interface gesture is adapted to the form factor of the first computing device and the second user interface gesture is adapted to the form factor of the second computing device; and
executing the determined additional series of instructions.

6. The method of claim 1, wherein the first computing device and the second computing device are communicatively connected to a server device through a wireless access point, and wherein receiving the command regarding operation of the application comprises receiving, by the first computing device, a transmission of data indicative of the command from the server device.

7. The method of claim 1, wherein the first computing device and the second computing device are communicatively connected through a wireless network, the method further comprising:
receiving, by the first computing device, a first execution time for the determined series of instructions, wherein the first execution time is synchronized to a second execution time for a series of instructions for the second computing device, and wherein the first execution time is based on a network time delay associated with the first computing device; and executing, by the first computing device, the determined series of instructions for the first computing device at the first execution time.

8. The method of claim 1, wherein the first computing device and the second computing device are floor-model computing devices in a product display kiosk.

9. The method of claim 1, wherein, the form factor of the first computing device comprises a first set of hardware modules, wherein the form factor of the second computing device comprises a second set of hardware modules different from the first set of hardware modules, wherein the first version of the application is adapted to hardware capabilities of the first set of hardware modules, and wherein the second version of the application is adapted to hardware capabilities of the second set of hardware modules.

10. The method of claim 1, wherein the form factor of the first computing device and the form factor of the second computing device are each selected from the group consisting of a personal computer, a laptop computer, a tablet, a phone, a watch, and a television.

11. The method of claim 1, further comprising:
receiving, from a user interface of the first computing device, an input signal indicative of a user interaction with the first computing device; and
in response to receiving the input signal, ceasing to execute, by the first computing device, the determined series of instructions while the second computing device continues to display visual representations of the activity on the second computing device.

12. The method of claim 1, wherein the application is an email application, and wherein the activity is selected from the group consisting of displaying a content of an email inbox, composing an email, displaying a received email, deleting an email, and displaying a list of contacts.

13. The method of claim 1, wherein the application is a video player application, and wherein the command regarding operation of the application comprises instructions to display a synchronized animation across the first computing device and the second computing device.

14. The method of claim 13, wherein the first computing device and the second computing device are arranged in a particular spatial layout, and wherein the determined series of instructions indicate to display the synchronized animation on the first computing device according to the particular spatial layout.

15. The method of claim 1, further comprising;
monitoring at least one of a frequency of user interaction or a duration of the user interaction with the first computing device and with the second computing device; and
determining that the first computing device is more popular than the second computing device based on at least one of (i) the monitored frequency of the user interaction with the first computing device being higher than the monitored frequency of the user interaction with the second computing device or (ii) the monitored duration of the user interaction with the first computing device being higher than the monitored duration of the user interaction with the second computing device.

16. The method of claim 15, wherein the first computing device and the second computing device are arranged in a particular spatial layout, the method further comprising:
in response to determining that the first computing device is more popular than the second computing device, providing a prompt to swap a position of the second computing device within the particular spatial layout with a position of the first computing device within the particular spatial layout.

17. The method of claim 15, further comprising:
in response to determining that the first computing device is more popular than the second computing device, providing a prompt to swap the second computing device for a third computing device.

18. The method of claim 15, further comprising:
in response to determining that the first computing device is more popular than the second computing device, adjusting at least one of a volume, a brightness, or a color of the displayed visual representations of the activity on at least one of the first computing device or the second computing device.

19. A system comprising:
a first computing device having a first form factor;
a second computing device having a second form factor different from the first form factor; and
a server device communicatively connected to the first computing device and the second computing device, wherein:
the server device is configured to provide, to the first computing device and to the second computing device, a command regarding operation of an application, wherein a first version of the application is configured to execute on the first computing device, and wherein a second version of the application different from the first version is configured to execute on the second computing device;
the first computing device is configured to receive, from the server device, the command regarding operation of the application;
the first computing device is additionally configured to determine, in response to receiving the command, a series of instructions that cause the first version of the application to display visual representations of an activity on the first computing device synchronized to displayed visual representations of the activity on the second computing device, wherein the displayed visual representations are adapted to differentiate between visual appearances of the activity in the first and the second versions of the application by displaying, in the first version of the application, a portion of a first arrangement of a first set of selectable icons for performing activities in the first version of the application, wherein the portion of the first arrangement is selected to maintain visual synchronization of the activity between the first and second computing devices, wherein the first set of selectable icons is different from a second set of selectable icons for performing the activities in the second version of the application, and wherein the first arrangement is different from a second arrangement of the second set of selectable icons in the second version of the application; and
the first computing device is configured to execute the determined series of instructions.

20. A non-transitory computer readable storage medium having stored thereon instructions that, when executed by a first computing device, cause the first computing device to perform operations comprising:
receiving a command regarding operation of an application, wherein a first version of the application is configured to execute on the first computing device, and wherein a second version of the application different from the first version is configured to execute on a second computing device that has a different form factor than the first computing device;
in response to receiving the command, determining a series of instructions that cause the first version of the application to display visual representations of an activity on the first computing device synchronized to displayed visual representations of the activity on the second computing device, wherein the displayed visual representations are adapted to differentiate between visual appearances of the activity in the first and the second versions of the application by displaying, in the first version of the application, a portion of a first arrangement of a first set of selectable icons for performing activities in the first version of the application, wherein the portion of the first arrangement is selected to maintain visual synchronization of the activity between the first and second computing devices, wherein the first set of selectable icons is different from a second set of selectable icons for performing the activities in the second version of the application, and wherein the first arrangement is different from a second arrangement of the second set of selectable icons in the second version of the application; and
executing the determined series of instructions.

* * * * *